Oct. 11, 1949. W. A. DERR 2,484,208
REMOTE-CONTROL SYSTEM
Filed March 27, 1947 3 Sheets-Sheet 1

Dispatching Office
Supervisory and Control
Equipment.

WITNESSES:

INVENTOR
Willard A. Derr.
BY
ATTORNEY

Oct. 11, 1949. W. A. DERR 2,484,208
REMOTE-CONTROL SYSTEM
Filed March 27, 1947 3 Sheets-Sheet 3

WITNESSES:
E.G. M?C?osky
G.V. Giblma

INVENTOR
Willard A. Derr.
BY J.M. Crawford
ATTORNEY

Patented Oct. 11, 1949

2,484,208

UNITED STATES PATENT OFFICE 2,484,208

REMOTE-CONTROL SYSTEM

Willard A. Derr, Wilkinsburg, Pa., assignor to Westinghouse Electric Corporation, East Pittsburgh, Pa., a corporation of Pennsylvania Application March 27, 1947, Serial No. 737,661

10 Claims. (Cl. 177—353)

My invention relates, generally, to remote control systems, and it has reference in particular to combined supervisory control and remote metering systems of the multiple station type.

Generally stated, it is an object of my invention to provide an improved remote control and metering system which is simple and inexpensive to manufacture, and which is easy to operate.

More specifically, it is an object of my invention to provide for obtaining selective continuous metering over the signal channel of a supervisory control system of the multiple station type.

Another object of my invention is to provide for using a plurality of metering transmitters at remote stations in a multiple station supervisory control system for selectively operating their respective receivers at a dispatching office.

It is also an important object of my invention to provide for normally maintaining a predetermined value of signal channel impedance by shunting the transmitters and receivers connected to the signal channel of a supervisory control system and for selectively removing the shunts from associated transmitters and receivers when a metering indication is desired.

It is a further object of my invention to provide for using a series circuit signal channel for both supervisory control operations and for remote metering, so as to readily permit supervision of the signal channel.

Yet another object of my invention is to provide a selective remote metering system which will operate over supervisory control signal channels having loop resistances as high as 5,000 ohms.

Another important object of my invention is to provide for continuous selective remote metering from a plurality of remote stations in a multiple station supervisory control system.

Yet another important object of my invention is to provide for continuous telemetering over the signal channel of a supervisory control system without the metering equipment causing any variation of the channel impedance during a supervisory or control operation.

Other objects will in part be obvious, and will, in part, be explained hereinafter.

In practicing my invention in one of its forms, the signal channel of a multiple station supervisory control system is arranged for connecting the line relays and impulsing relays at the different remote stations in series circuit relation with the line relay and the impulsing relay at the dispatching office. Metering transmitters for current, voltage, etc., are arranged for connection in series circuit relation with the signal channel at certain control points of the different stations. Corresponding metering receivers are arranged likewise at the dispatching office. The transmitters and receivers are normally shunted so as to maintain a predetermined value of signal channel impedance for supervisory control operations. The shunts are selectively removed from a particular transmitter and its corresponding receiver upon the selection of the desired metering point from the dispatching office. The transmitters and receivers are so controlled that a supervisory or control signal occurring during a metering operation effectively shunts and/or disconnects the transmitters and receivers from the signal channel until the supervisory control operation is completed. The different metering points at the dispatching office are so interlocked that a second metering point may not be selected while a metering operation is taking place.

For a more complete understanding of the nature and scope of my invention, reference may be made to the following detailed description which may be studied in connection with the accompanying drawings, in which.

Figure 1:
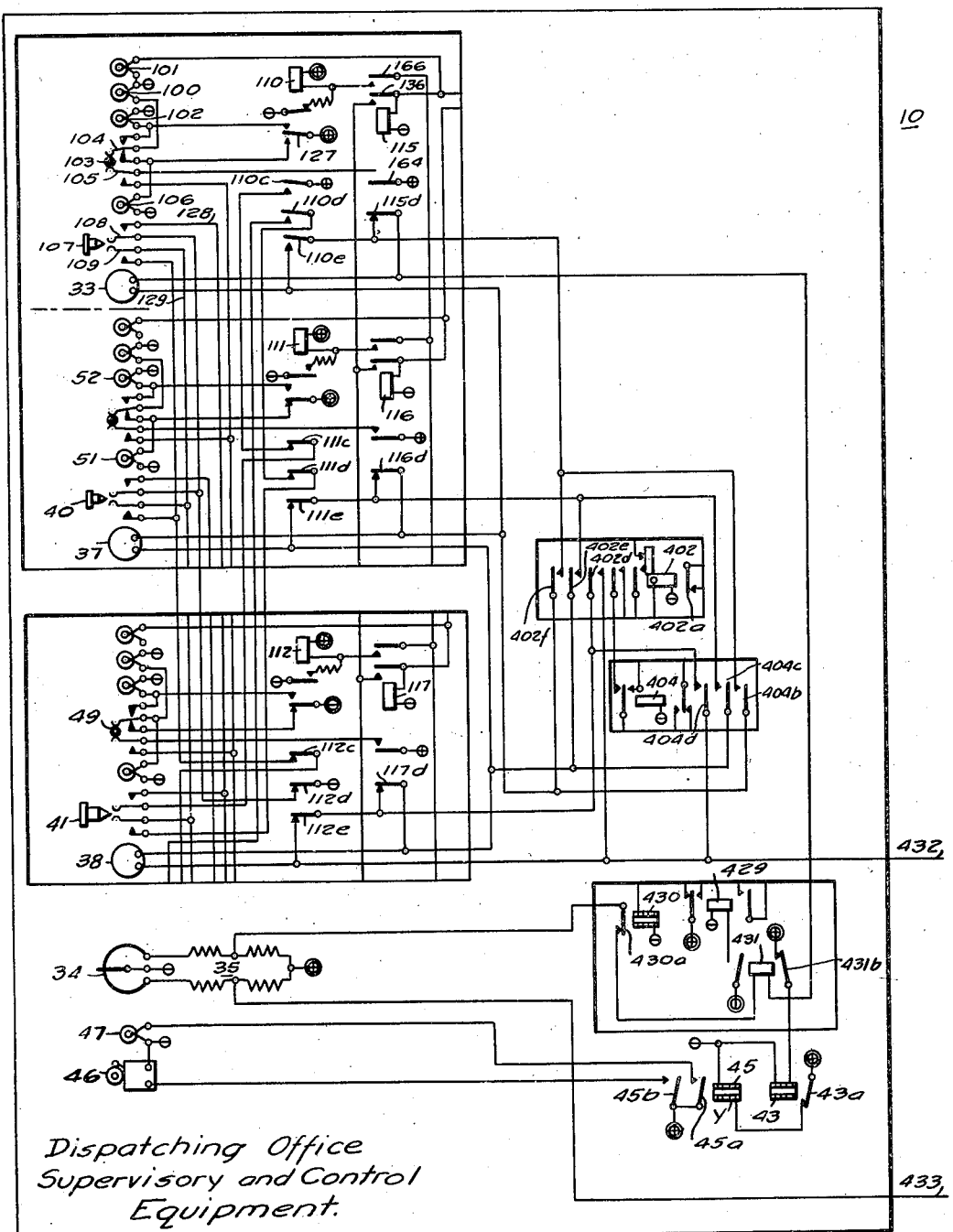
Figure 1 is a diagrammatic view of the dispatching office supervisory and control equipment in a multiple station system embodying my invention in one of its forms.

The preferred embodiment of the invention is shown and described herein for purposes of illustration as it may be applied to a supervisory control system of the type disclosed in Patent No. 2,059,204 which issued on November 3, 1936 to H. P. Boswau. For convenience of description, and in order to refrain from unnecessarily confusing the invention with the more or less involved circuits of the Boswau patent, the supervisory and control equipment at the dispatching office which comprised Figs. 1 through 4 of the Boswau patent has been represented generally by a single enclosure in Fig. 1 of the drawings in the present instance. The supervisory and control equipment of Figs. 5, 6 and 7 of the Boswau patent has been represented by the single enclosure at substation A of Fig. 2, and an additional substation X has been added with similar equipment in order to fully illustrate the application of the invention to a multiple station system. Fig. 3 has been patterned after Fig. 10 of the Boswau patent, but with the designations of Figs. 1 and 2 used, instead of those of the Boswau patent.

All of the equipment of the Boswau patent which has not been changed in any respect remains within the enclosures and is not illustrated in detail. All of the equipment of the Boswau patent to which any changes have been made has been shown as viewed through windows in the enclosures. The elements of the system of the Boswau patent shown in Figs. 1 and 2 bear the same reference characteristics as in the Boswau patent drawing. All additional equipment is shown as superimposed on the main enclosure, and is designated by reference characters which are not found in the Boswau patent.

Figure 2:
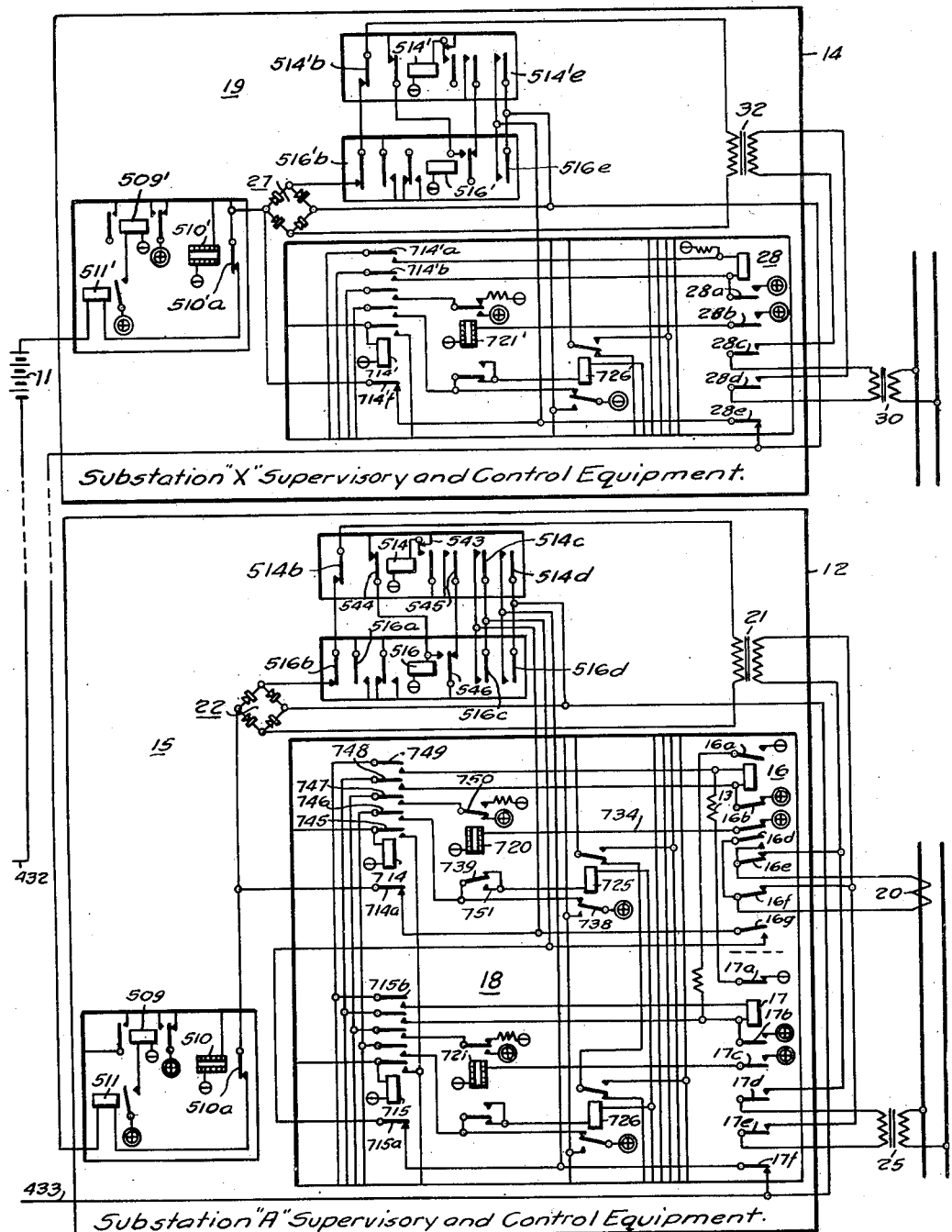
Fig. 2 is a diagrammatic view of the supervisory and control equipment at two remote stations connected with the dispatching office of Fig. 1.
Figure 3:
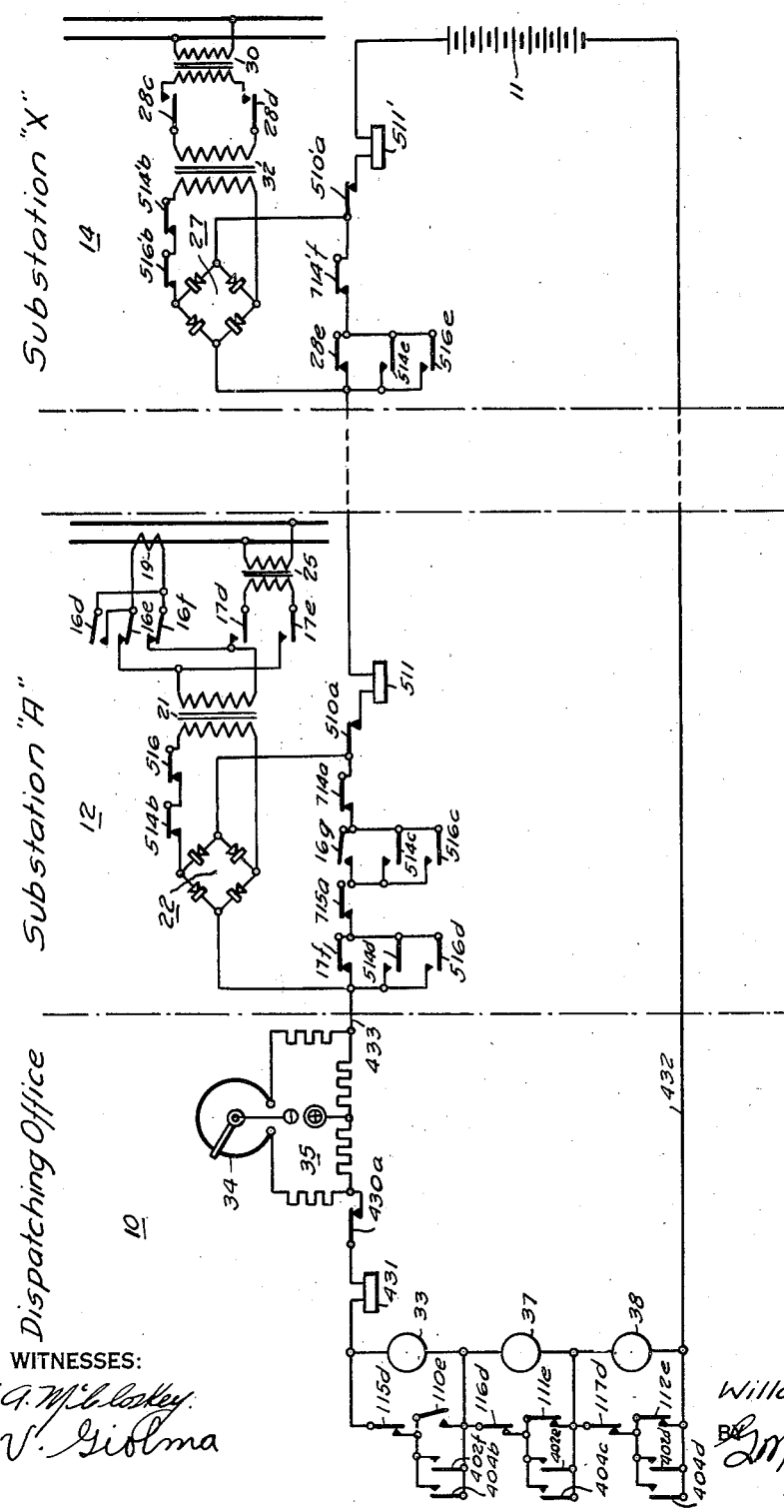
Fig. 3 is a simplified diagrammatic view of the signal channel and the associated supervisory control and metering equipment used in connection with the system of Figs. 1 and 2.

Referring generally to Figs. 1 and 2 of the drawings, the reference numeral 10 of Fig. 1 may designate generally an enclosure which represents the supervisory control equipment at the dispatching office of a multiple station system, such as is described in detail in the Boswau patent hereinbefore referred to. The reference numerals 12 and 14 of Fig. 2 of the drawings designate enclosures which represent the supervisory and control equipment at two of the remote substations A and X, respectively, which may be associated in a multiple station system with the dispatching office of Fig. 1.

It will be seen that the first control point at the dispatching office of the Boswau patent, which was used to control a circuit breaker at one of the remote stations, has been arranged for controlling a metering point 15 of the supervisory control equipment 12 at substation A, wherein a metering relay 16 has been substituted for the "close" and "trip" relays 730 and 731. The second control point at the dispatching office, which was illustrated in the Boswau patent as associated with the auxiliary switch 735 at the remote station, has been arranged for controlling a metering relay 17 at the metering point 18 at the substation A for performing a metering operation. The third control point at the dispatching office of the Boswau patent, has been arranged for controlling a metering point 19 at the remote substation X.

From either Figs. 1 and 2, or Fig. 3 it will be apparent that the signal channel has been arranged to provide a series circuit such as shown in Fig. 10 of the Boswau patent, with the exception that the line battery source 11 is at the remote substation X in the present instance. The line relay 431 at the dispatching office and the line relay 511 at substation A are connected in series circuit relation with armatures 430a and 510a of the impulsing relays 430 and 510, respectively.

For purpose of simplification, the supervisory and control equipment at the second substation X, which is not shown in detail in the Boswau patent, has been designated by primed numerals corresponding to the designations of similar equipment at substation A. The line relay 511' and armature 510'a at substation X may likewise be connected in series circuit relation with the signal channel. The invention has been illustrated with the metering relay 16 energized to connect the metering point 15 for a metering operation, so as to correspond with the showing of the equipment in the Boswau patent.

In order to provide a metering indication at the dispatching office from the point 15 at substation A, a metering transmitter may be provided at substation A comprising a current transformer 20, which may be used in connection with an auxiliary transformer 21 for applying an alternating current voltage to a full-wave rectifier transmitter device 22. The rectifier 22 may be connected in series circuit relation with the signal channel conductors 432 and 433, for applying thereto a voltage which is proportional to the value of the current measured by the transformer 20.

For the purpose of maintaining the impedance of the signal channel at substantially a normal value when not metering and thus improving signal conditions, the metering relay 16 may be used for providing a circuit to normally shunt the rectifier 22 from the signal channel. Armature 16g of the metering relay may be used for this purpose. The current transformer 20 may be disconnected from the auxiliary transformer 21 through armatures 16e and 16f when the metering point is not in operation. An additional armature 16d may be used to short circuit the current transformer 20 to prevent a dangerously high open circuit voltage from being developed.

Control of the metering point may be effected by connecting the metering relay 16 to the supervisory control equipment through armatures 748 and 749 of the point relay 714. The "close" conductor which is energized through armature 748 from the substation battery may be connected to one terminal of the metering relay 16 and to armature 16b whose front contact is connected to direct positive. By connecting the other terminal to negative through a resistor 13, operation of the metering relay 16 may be effected to connect the rectifier 22 in series circuit relation with the signal channel conductors 432 and 433 when a "close" operate code is transmitted from the first point of the dispatching office. Likewise, by connecting the "trip" conductor which is energized through armature 749 of the point relay, to said other terminal, the metering relay will be shunted down to effectively disconnect the rectifier 22 from the signal channel when a "trip" code is transmitted. Armature 714a of the point relay 714 may be utilized to connect the rectifier 22 in circuit relation with the signal channel conductors when the metering point is selected, so that the channel may be calibrated for metering, as will be hereinafter explained in detail.

In order to provide for continuous telemetering and yet give preference to supervisory and control signals originating at either the dispatching office or any of the control points at the remote substations, provision may be made for disconnecting the rectifier 22 from the signal channel and rendering it ineffective whenever such a supervisory or control function is commenced. For this purpose, the rectifier may be disconnected from the auxiliary transformer 21 by either armature 514b of the receiving or start prevent relay 514, or armature 516b of the starting relay 516. At the same time, armatures 514c and 516c of these relays may be used to shunt armature 16g of the metering relay so as to effectively shunt the rectifier 22 from the signal channel and restore the normal signal impedance value of the channel, whenever a supervisory or control operation is commenced while a metering operation is taking place.

At control point 18 of substation A, provision may be made for a metering indication of another quantity, such as a voltage from a potential transformer 25 by applying it to the signal channel conductors through the same rectifier 22. The transformer 25 may be connected to the auxiliary transformer 21 by means of armatures 17d and 17e of the metering relay 17. The metering relay 17 may be controlled through armature 715a of the point relay 715, in a manner similar to that described hereinbefore in connection with the metering relay 16, for actuating armature 17f which is connected in circuit relation with armature 16g, to connect the rectifier 22 in circuit relation with the signal channel. Armatures 514d and 516d of the start prevent relay 514 and the starting relay 516, respectively, of the supervisory control equipment may be used to shunt armature 17f of the metering relay 17, for shunting the rectifier 22 from the signal channel whenever a supervisory or control operation is commenced from another control point, while the metering relay 17 is operated during a metering operation from the control point 16.

It will be seen that the metering arrangements at the remote control point 19 at substation X may be similar to those for the control points at substation A. For example, a rectifier 27 may be arranged for connection in series circuit relation with the signal channel conductors 432 and 433 by a metering relay 28 which removes a shunt across the rectifier through armature 28e when it is energized. The rectifier 27 may be energized from a potential transformer 30, through an auxiliary transformer 32. The metering relay 28 may be arranged to normally shunt the output circuit of the rectifier 27 through armature 28e. The auxiliary transformer 32 may be connected to the potential transformer 30 through armatures 28c and 28d.

The metering relay 28 may, as hereinbefore described, also be arranged for operation in response to the "close" and "trip" codes transmitted from the dispatching office through the "close" and "trip" circuits of the Boswau patent which are set up through armatures 714'a and 714'b of the point relay 714'. The shunt across the rectifier circuit may be removed for calibration purposes by connecting armature 714'f of the point relay in series circuit relation with armature 28c.

As described in connection with the equipment at substation A, the receiving or start prevent relay 514' may be arranged to shunt the output circuit of the rectifier 27 through armature 514'e and front contact whenever an incoming supervisory or control signal is received. The start relay 516' may be arranged to shunt the output circuit of the rectifier circuit 27 through armature 516'e and front contact in case a supervisory or control operation is initiated from another point at the substation X. The input circuit of the rectifier 27 may be interrupted under these conditions by armatures 514'b and 516'b, respectively.

At the dispatching office, as shown in Fig. 1, a suitable metering receiver 33 may be associated with the first point for operation in response to the output voltage of the rectifier 22 when the remote metering point 15 is selected. The receiver 33 may be connected in series circuit relation with the channel conductors 432 and 433 and the line relay 431 at the dispatching office. In order to provide for normally blocking the receiver 33 from the signal channel, armature 110e of the supervisory point relay 110 may be arranged for normally shunting the receiver 33 when this point is not operating, and the relay 110 is in the deenergized position.

For the purpose of calibrating the receiver to existing signal channel conditions, armature 115d of the individual point relay 115 may be connected in series circuit relation with the armature 110e of the receiver 33 in series circuit relation with the channel conductors 432 and 433 when the individual point relay 115 operates upon receipt of the point selection check code from the remote substation A. Means such as the potentiometer 34 and the bridge circuit 35 may be provided for inserting a variable reversible calibrating voltage in circuit relation with the channel conductors to calibrate the signal channel and provide a zero value of line current of 5 milliamperes, for example, in order to zero the receiver 33 without varying the effective impedance of the channel.

In order to provide for effectively blocking the metering receiver 33 from the signal channel during a supervisory or control operation which may be initiated during a metering operation, provision may be made for shunting the armature 110e of the supervisory point relay 110. For example, armature 402f of the receiving start relay 402 may be connected in shunt circuit relation with the armature 110e, since the receiving start relay picks up immediately upon the receipt of any supervisory signal from any one of the remote stations. Armature 404b of the sending start relay 404 may be connected in parallel circuit relation with the armature 402f for shunting the metering receiver 33 whenever a supervisory or control operation is initiated from the dispatching office during a metering operation Additional metering receivers 37 and 38 may be provided at the second and third control points of the dispatching office for operation in response to metering signals transmitted from the remote metering points 18 and 19 at the remote substations A and X, respectively. The metering receivers 37 and 38 may also be connected in series circuit relation with the signal channel conductors 432 and 433 and receiver 33. The supervisory point relays 111 and 112 associated with these points may be used to control the connection of the receivers 114 and 115 through armatures 111e and 112e, respectively, which shunt the receivers when the relays are in the deenergized position.

The receivers 37 and 38 may be connected in series circuit relation with the signal channel conductors upon the selection of their respective metering points by means of armatures 116d and 117d of the individual point relays 116 and 117 associated with the respective control points, so as to provide for calibrating the signal channel for metering operations. Provision may also be made for effectively disconnecting the receivers 37 and 38 from the signal channel upon the initiation of supervisory or control operations from any of the control points by means of armatures 402e, 402d and front contacts of the receiving start relay 402, and armatures 404c, 404d of the sending start relay 404, which parallel armatures 116d and 117d, respectively, in a manner similar to that described in connection with the metering receiver 33.

Since it is generally undesirable to permit the initiation of a second metering operation while one is already taking place, means may be provided at the dispatching office for interlocking the metering control points of the different remote substations. For example, the operating circuits controlled by the operating key 107 of the first control point and the operating key 40 of the second point, which was shown but not identified in the Boswau patent, may be passed through armatures 112c, 112d and back contacts of the individual point relay 112 of the third control point. This means that if an attempt is made to select either the metering point 15 or the point 18 at the substation A, when the metering point 19 at substation X is being used for a metering indication, the operating keys 107 and 40 will be ineffective to select the points 15 and 18.

Likewise, by utilizing armatures 110c, 111c, and 110d, 111d in circuit relation with the operating key 41 of the third control point for the control of the metering point 19 at substation X, the operating key thereof may likewise be rendered inoperative if a metering operation is taking place from either the control point 15 or the control point 18 at substation A. Interlocking between the two control points 15 and 18, which are both at substation A, may be provided by connecting the operating circuits for the meter relays 16 and 17 through armatures 17a and armatures 16a, respectively.

In order to provide for line supervision of the signal channel, means such as the line supervision relay 43 may be utilized. The line supervision relay may be of the slow release type, and may be connected to a suitable source of control potential in circuit relation with the armature 431b of the line relay 431. Since the signal channel is normally energized, and the line relay is normally in the energized position, the line supervision relay 43 will likewise be normally maintained in the energized position. The line supervision relay may be used to control an alarm relay 45 over armature 43a for effecting operation of an alarm 46 and lighting a line supervision lamp 47 over armatures 45a and 45b when the alarm relay is deenergized for a predetermined length of time, such as might be caused by the failure of the station battery, or a fault on the signal channel.

The supervisory control system is, as has been stated, shown with the metering relay 16 at point 15 energized to connect the rectifier 22 in the signal channel. This is in accordance with the showing of the Boswau patent.

In operation of the system the operator may desire to remove the metering point 15 from the channel. He therefore actuates the operating key 107 of the first control point at the dispatching office, to select the metering point 15 at the remote substation A. The sending start relay 404 at the dispatching office and the receiving or start prevent relay 514 at substation A pick up on the first pulse. Relay 514' at substation X also picks up. From the line diagram shown in Fig. 3 it will be seen that the receiver 33 at the dispatching office and rectifier 22 at substation A are thereupon shunted by armatures 404b and 514c, respectively.

The station selection, group selection and point selection codes are transmitted in substantially the manner described in the Boswau patent hereinbefore referred to. Since the receiver 33 and rectifier 22 are shunted from the signal channel the signal channel impedance will be normal, and the supervisory and control operations will not be affected by the metering voltage from the control point 15. Upon receipt of the point selection code at the remote station A, the point relay 714 operates and sets up a control circuit for the metering relay 16 through armature 749 and its front contact. Operation of the point relay effects transmission of the point selection check code in the usual manner. Upon the receipt of the point selection check code, the individual point relay 115 at the dispatching office picks up and sets up a shunting circuit for the supervisory point relay 110 over armature 166.

The operator then transmits a control code by operating the control key 103 to the "off" position. Upon receipt of the operation code, the proper circuit is completed at substation A, through armature 749 of the point relay 714, for applying positive to shunt down the metering relay 16. When the relay 16 returns to the deenergized position, armature 16g parallels armature 514c, and auxiliary point supervisory relay 720 is deenergized, momentarily interrupting the energizing circuit of the point supervision relay 725 at armature 739. This results in a supervision code being transmitted to the dispatching office to indicate that the metering point 15 has been effectively disconnected. The disconnection is effected by armature 16g paralleling armature 514c and preparing a shunt for the output circuit of the rectifier 22 to block it from the signal channel, and by armature 16e and 16f disconnecting the current transformer 20 from the auxiliary transformer 21. Armature 16e shunts the current transformer 20 to prevent a dangerously high open circuit voltage from being produced.

At the dispatching office the supervisory point relay 110 is shunted down upon the receipt of the supervisory code from the remote station to complete the shunt across the receiver 33. The operating circuit for the "on" signal light 102 is interrupted by armature 127, which now provides an energizing circuit for the "off" signal light 106. The receiving meter 33 is effectively shunted from the signal channel by armature 110e which returns to the deenergized position. After completion of the supervisory code, the supervisory equipment is restored to normal by the customary long pulse. The point relay 714 drops out and completes the shunt across the rectifier 22 through armature 714a.

Should the operator now desire to select the remote metering point 18 at substation A, the operating key 40 may be actuated to transmit the proper station, group and point selection codes in the usual manner for selecting the metering point 18. The point relay 715 at substation A operates on receipt of the proper point selection code to connect the rectifier 22 in the signal channel at armature 715a, and set up an operating circuit for the metering relay 17 through armature 715b. Upon receipt of the point selection check code at the dispatching office, the individual point relay 116 is energized, and opens armature 116d from its back contact so as to connect the metering receiver 37 in series circuit relation with the line conductors 432 and 433. The receiving meter 37 may now be zeroed by operating the potentiometer 34 as in the case of the meter 33.

After calibration, the operator actuates the control twist key 49 of the second control point to transmit the "on" or "close" control code. Upon receipt of the control code at the substation, the energizing circuit for the metering relay 17 is completed, and the relay operates, connecting the potential transformer 25 to the auxiliary transformer 21 through armatures 17d and 17e and front contacts. At the same time, armature 17f is actuated to insure removal of the shunt from the output circuit of the rectifier 22 for substantially the duration of the metering operation, thus effectively connecting it in series circuit relation with the line conductors 432 and 433. The rectifier 22 of the metering transmitter and the metering receiver 37 are now both connected in circuit with the line conductors for effecting a continuous metering operation.

Operation of the metering relay 17 energizes the auxiliary point supervision relay 721, causing momentary interruption of the energizing circuit for the point supervision relay 726. Accordingly, a supervision code is transmitted to the dispatching office to show that the metering point is connected to the signal channel. Receipt of the supervision code effects operation of the point supervisory relay 111 which insures removal of the shunt from the receiver 37, for substantially the duration of the metering operation, and locks in to direct positive.

Operation of the point supervisory relay 111 interrupts the energizing circuit for the "off" signal lamp 51 and completes an obvious energizing circuit for the "on" signal lamp 52. After a predetermined interval of time, a relatively long pulse is transmitted over the signal channel, in the manner described in detail in the Boswau patent hereinbefore referred to, and the supervisory control equipment is reset, clearing the channel for metering operations. Since the point supervisory relay 111 is locked into direct positive, it is unaffected by the relatively long pulse, as is also the metering relay 17. Accordingly, the signal channel is connected for continuous metering.

Should a supervisory or control function initiate from any one of the other control points at either the dispatching office or at one of the remote stations, it is generally desirable that the signal channel be made available therefor. Accordingly, should a supervisory signal originate, for example, from some other control point at substation A, the receiving start relay 402 of the supervisory control equipment at the dispatching office will pick up and remain in the energized position until the termination of the operation. Operation of the relay 402 effectively shunts the metering receiver 37 over armature 402e and its front contact.

At substation A, the starting relay 516 will immediately pick up upon the initiation of the supervisory signal. This effectively disconnects the metering transmitter from the signal channel, since the output circuit of the rectifier 22 is shunted by armature 516c and its front contact. At the substation X, the receiving or start prevent relay 514' picks up upon the receipt of a supervisory signal to perform a similar function should the control point 19 be connected for metering instead of the control point 18.

Should the operator attempt to select the metering point 15 while the metering point 18 is in operation, the point may be selected, but operation of the metering relay 16 cannot be affected in response to the transmission of the "on" or "close" code, since the operating circuit for the metering relay 16 must be completed through armature 17a of the metering relay 17 which is in the energized position. Accordingly, the point supervisory relay 725 cannot be momentarily de-energized and the supervision code for showing the "on" condition of the metering transmitter cannot be transmitted. The operator will thus be advised of this condition by the disagreement lamp remaining lit instead of the "on" lamp lighting up. The reset button shown in the Boswau patent will thereupon have to be actuated to clear the system and restore it to normal.

From the above description and the accompanying drawing, it will be apparent that I have provided a supervisory control and remote metering system which is operable with a plurality of remote stations. A system embodying the features of my invention may be readily used for selective continuous telemetering from any one of a number of remote stations without interfering with the receipt of supervisory signals or the operation or remote equipment from other control points. By automatically restoring the normal signal impedance of the signal channel whenever a supervisory or control operation takes place, reliable and efficient operation of the supervisory control equipment may be affected. By providing for calibrating the signal channel for metering operations without varying the effective impedance of the signal channel, consistent and reliable operation of the system is facilitated.

Since certain changes may be made in the above described construction and different embodiments of the invention may be made without departing from the spirit and scope thereof, it is intended that all of the matter contained in the above description and shown in the accompanying drawings shall be considered as illustrative and not in a limiting sense.

I claim as my invention:

1. In a supervisory control system having a signal channel with a normal signal impedance connecting a plurality of remote stations and a dispatching office in a common series circuit relation with each other and a plurality of control points at the dispatching office having corresponding control points at different ones of the remote stations, metering means associated with certain of the dispatching office and remote station points arranged to be selectively connected in series circuit relation with the signal channel, and control means responsive to the initiation of a supervisory control signal from another of said points effective to remove the metering means from said series circuit relation and restore the normal impedance of the signal channel.

2. In a supervisory control system having a single series type signal channel connecting supervisory control equipment at a dispatching office and a plurality of remote stations with a plurality of corresponding control points, meter transmitting means and receiving means associated with certain of the points at the substations and the dispatching office for selective connection in series circuit relation with the signal channel for continuous metering, whereby the impedance of the signal channel is varied from a normal value, and control means responsive to a supervisory signal operable to remove said transmitting and receiving means from the signal channel during a supervisory signal from certain others of the control points and restore the impedance of the signal channel to a normal value.

3. In a multiple station supervisory control system having supervisory control equipment with a plurality of control points at a dispatching office and a plurality of remote stations connected in series circuit relation by a signal channel having a normal signal impedance, metering transmitting means at certain of said points at the remote stations operable to produce control voltages proportional to quantities to be metered, metering receiving means at corresponding points at the dispatching office responsive to said voltages, circuit means at said certain points at the dispatching office and remote stations selectively connecting the metering receiving means and the metering transmitting means of one of said certain points at the dispatching office and the corresponding point at one of the remote stations in series circuit relation with the signal channel, and circuit means associated with the metering points at each of the remote stations and the dispatching office including means responsive to the initiation of a supervisory control operation from another of the points operable to restore the series circuit signal channel to its normal impedance.

4. In a supervisory control system having a plurality of remote stations and a dispatching office each having a line relay and impulsing means connected in a common series circuit relation by a signal channel having a predetermined normal signal impedance, said stations and dispatching office having control points for controlling their respective impulsing means to operate said line relays, metering transmitting means at certain of the points at different ones of the remote stations, metering receiving means at the dispatching office, means responsive to the selection of any one of the control points operable to connect the metering transmitting means at said point and the corresponding metering receiving means at the dispatching office in series circuit relation in the signal channel, and means responsive to the initiation of a supervisory signal from other of the control points than those associated with the metering means operable to remove the metering means from the signal channel and restore the series circuit signal channel to its normal impedance so long as the supervisory signal continues.

5. In a supervisory control system having supervisory control equipment at each of a plurality of remote stations and a dispatching office including a plurality of control points connected by a series type signal channel, metering transmitting means at certain of the control points at different ones of the remote station including means producing control voltages dependent on the quantity to be metered, metering receiving means at corresponding control points at the dispatching office, means responsive to the selection of a control point at one of the remote stations having metering means associated therewith effective to effect connection of the transmitting means and the receiving means in series circuit relation in the signal channel for continuously operating the receiving means, and additional means responsive to the initiation of a signal from a control point other than a metering point operable to shunt the transmitting and receiving means from the signal channel while said other control point operates.

6. In a supervisory control system having a dispatching office and a plurality of remote stations each with supervisory control sending and receiving equipment connected in series circuit relation by a common signal channel and provided with a plurality of control points, metering transmitting means associated with certain of the points at the remote stations, metering receiving means associated with the corresponding control points at the dispatching office, means operable from the control station over said corresponding control points to selectively connect one of the metering transmitting means and its corresponding receiving means at the dispatching office in circuit relation with the signal channel for a continuous metering operation, and means at the dispatching office interlocking the metering control points to prevent initiation of another metering operation while one metering operation is taking place.

7. In a supervisory control system having a plurality of remote stations and a dispatching office connected by a series circuit signal channel and having a plurality of corresponding control points, a metering transmitter associated with certain of the control points at different ones of the remote stations, a metering receiver associated with the corresponding control points at the dispatching office, means operable from said corresponding control points at the dispatching office to selectively connect one of the metering receivers in circuit relation with the channel, means at the dispatching office to adjust the effective channel current without varying the channel impedance, control means operable in response to a predetermined signal from the dispatching office to connect the corresponding metering transmitter in circuit relation with the signal channel, and means responsive to a supervisory or control operation operable to shunt the metering transmitting and receiving means from the signal channel.

8. In a supervisory control system having supervisory control equipment with a plurality of control points at a plurality of remote stations and a dispatching office connected by a common series type signal channel, metering transmitting means at certain of the control points at two or more of the remote stations and metering receiving means at the corresponding control points controllable to be connected in circuit with the signal channel from the dispatching office for continuous metering operation, relay means responsive to the initiation of a supervisory or control signal operable to effectively disconnect the metering transmitting and receiving means from the channel and restore the signal channel for a supervisory or control operation, and control means at said corresponding control points at the dispatching office operable to prevent initiation of a metering operation from one of said points while a metering operation is taking place from another of said points.

9. In a supervisory control system supervising control sending and receiving means with corresponding control points at a dispatching office and a plurality of remote stations connected in series circuit relation by a single signal channel, metering transmitters at certain of the remote station control points selectively connectable in series circuit relation with the channel from the corresponding control points at the dispatching office, metering receivers at said corresponding control points arranged to be connected in circuit relation with their respective transmitters, means at the dispatching office and each of the remote stations operable in response to the initiation of a supervisory or control function from any of the other control points to effectively disconnect the metering transmitters and receivers from the signal channel, and circuit means at the dispatching office responsive to the selection of one metering control point operable to prevent the selection of another metering point.

10. In a supervisory control system having a signal channel connecting a remote station and a dispatching office, supervisory control equipment at the dispatching office and corresponding supervisory control equipment at the remote station selectively operable over the channel to select one of a plurality of control points at the remote station, metering transmitter means at the remote station disposed to be selected through one of said control points for connection in the signal channel, associated metering receiver means at the dispatching office disposed to be connected in the signal channel, and circuit means at the dispatching office and remote station including relay means disposed to provide shunt circuits about the metering means, said relay means being operable in response to the selection of a metering point to interrupt said shunt circuits and connect the corresponding transmitter and receiver means at a remote station and the dispatching office in series circuit relation with the signal channel.

WILLARD A. DERR.

REFERENCES CITED

The following references are of record in the file of this patent:

UNITED STATES PATENTS

| Number | Name | Date |
|---|---|---|
| 1,394,642 | Quass | Oct. 25, 1921 |
| 1,682,049 | Meyers | Aug. 28, 1928 |
| 2,011,237 | Baughman | Aug. 13, 1935 |
| 2,059,204 | Boswau | Nov. 3, 1936 |
| 2,259,573 | Lewis | Oct. 21, 1941 |
| 2,314,692 | Derr | Mar. 23, 1943 |
| 2,327,251 | Derr | Aug. 17, 1943 |
| 2,431,631 | Baughman | Nov. 25, 1947 |